April 18, 1933.     E. B. TURNER     1,903,798
CARRIER CASE
Filed April 29, 1930
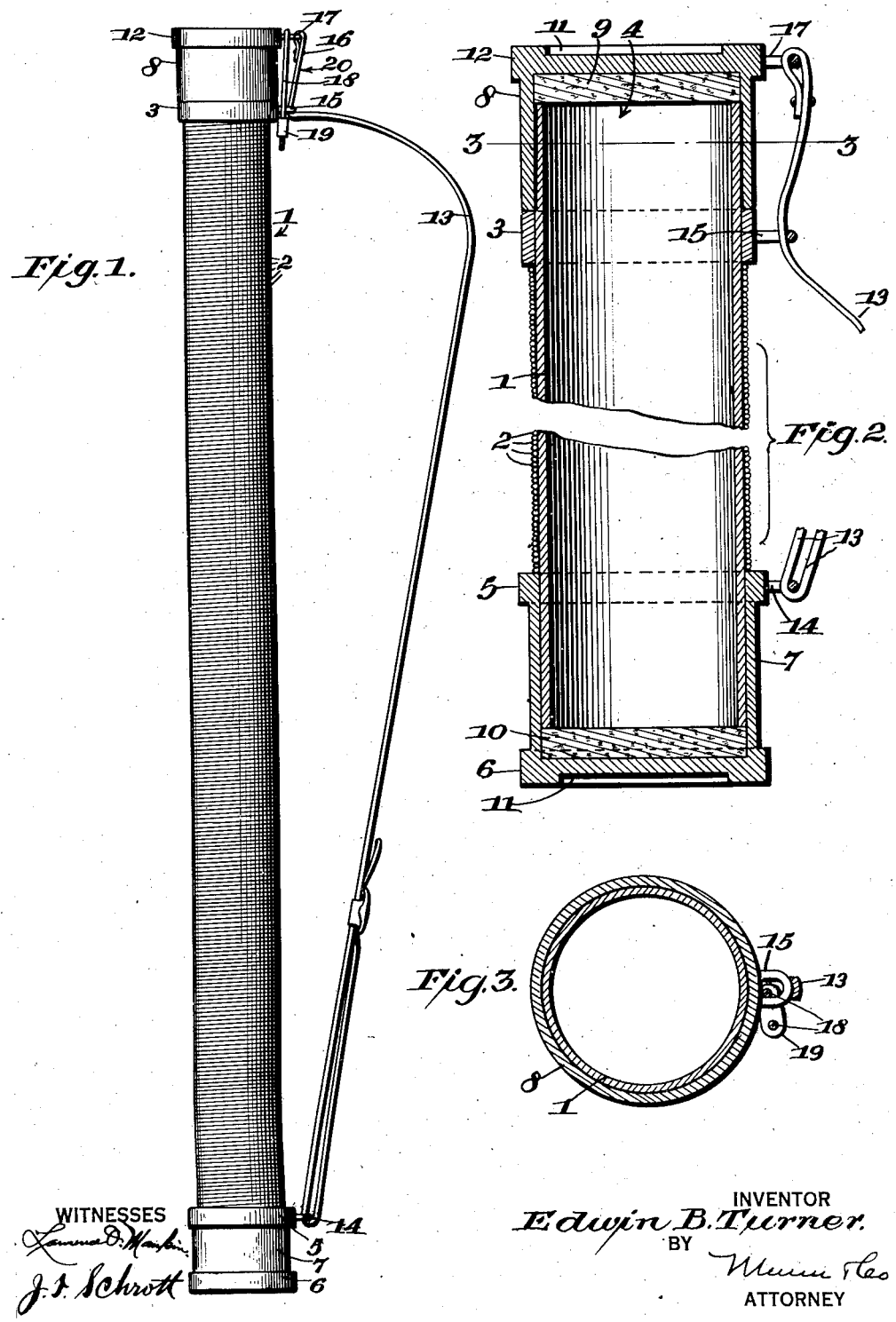
INVENTOR
Edwin B. Turner.
BY
ATTORNEY Patented Apr. 18, 1933

1,903,798

UNITED STATES PATENT OFFICE

EDWIN B. TURNER, OF WELLINGTON, OHIO

CARRIER CASE

Application filed April 29, 1930. Serial No. 448,329.

This invention relates to improvements in carrier cases, being especially adapted for carrying disjointed fishing rods and the like, and it consists of the constructions, combinations and arrangements herein described and claimed.

An object of the invention is to provide a tubular case of inherently rigid material such as metal, particularly adaptable to carrying disjointed fishing rods so that the ordinary handling of these as in transportation from place to place will not result in injury thereto, the element of protection desired to be afforded being augmented not only by the novel form of cap but by the arrangement of reinforcing elements which appear at the approximate extremities of the case.

Another object of the invention resides in the novel manner of attaching the carrier strap, the connection of one end thereof with the cap not only affording the mounting of that end but establishing the additional purpose of retaining or so combining the cap with the body of the case that the cap cannot become lost.

Other objects and advantages will appear in the following specification, reference being had to the accompanying drawing in which Figure 1 is a side elevation of the improved carrier case.

Figure 2 is a sectional view with the medial portion broken away to enable an enlarged showing of the details.

Figure 3 is a cross section on the line 3—3 of Figure 2.

As has been indicated already in the foregoing brief statements, it is one of the main purposes of the invention to provide a tubular case embodying such structural arrangements and composed of such material that the joints of fishing rods can be transported without danger of bending, crushing or otherwise mutilating them in the somewhat rough handling to which they are often subjected at the beginning and ending of fishing trips. The use of the case in connection with disjointed fishing rods is cited merely as an illustration. It is quite within the province of the invention to use the case in the transportation of other fragile objects, and as an extension of the idea it is proposed to use the device as a mailing case and by which fishing rods, etc. can be shipped over long distances in safety.

It comprises a metallic or other tube 1 which for the major part of its length is covered with a wrapping 2 of cord or the like for the purposes of improving one's grip on the case, enhancing the appearance and in a large measure protecting the outer surface of the tube from water which may have a corrosive effect on the metal.

This wrapping 2 stops short at one end at a rather heavy reinforcing ring 3 which is permanently secured to the tube 1 in any approved manner at a place approximately an inch or so below the tube opening 4. The other end of the wrapping 2 stops at one of a pair of flanges 5, 6 outstanding from a metal end or cup 7 into which the other end of the tube 1 is permanently fitted.

The ring 3 and flanges 5, 6 constitute reinforcing elements which play a large part in sustaining the tube 1. The ring 3 serves as a stop for a closure cap 8 which can be put on or taken off at will in respect to the respective end of the tube 1. This cap makes a closed joint and also gives depth to the joint inasmuch as it receives all of that portion of the tube appearing above the ring 3.

Felt or cork pads 9, 10 respectively in the cap 8 and cup 7 abut the respective ends of the tube 1. The purpose of these pads is to prevent bruising the ends of the fishing rod joints. It is to be observed that both the cap 8 and cup 7 are recessed at 11 thus producing an outstanding flange 12 in the instance of the cap 8, and the outstanding flange 6 already mentioned in connection with the cup 7.

It will be understood at once that should the carrier case be dropped it will likely fall either on one or both of the flanges 6, 12. Since these flanges are annular and considerably heavier than the adjoining parts it follows that damage to the tube itself is not likely to occur.

A shoulder or carrier strap 13 facilitates the transportation of the case. The lower end of this is secured to an eye 14 carried by the flange 5 of the cup 7. The other end is first threaded through an eye 15 on the ring 3 then permanently secured at 16 to an eye 17 on the flange 12 of the cap 8.

This arrangement has two advantages: The eyes 15, 17 which are primarily intended as the places where the long shackle of a padlock 19 is to be secured, constitute the mounting for one end of the strap. By virtue of the fact that the strap is first passed through the eye 15, which is virtually an integral part of the case body and then secured to the cap 8, it follows that the cap will never be lost.

Therefore, there is mutual association between the cap 8 and the strap 13 to the end that the cap relies on the strap for its retention in combination with the body of the case and that the strap relies in part upon the cap 8 for its mounting. The long shackle 18 of the padlock enables locking the cap in the closed position and when the padlock 19 and shackle are removed the cap can be taken off by pulling it straight off from the end of the tube 1.

The peculiar mode of applying the strap 13 to the eyes 15, 17 is the occasion of another advantageous feature which will appeal to the sportsman when carrying the case about. It is to be observed (Fig. 1) that the portion 20 of the strap appearing between the eyes 15, 17 is perfectly loose with the exception of the restraint put upon it by the eyes. This portion can be taken hold of by the thumb of one hand and pulled out into the shape of a loop. This not only provides a thumb and hand rest for the arm by which the case is carried but what is more important, draws up on the strap 13 and by virtue of making it shorter compresses the case tighter against the body of the fisherman.

It is desired to emphasize the protection which the case will afford the joints of fishing rods. The case may be laid in an automobile directly in front of the rear seat or directly behind the front seat, and has ample strength to prevent injury to the rods even should a person step directly on the case or if baggage in the car is permitted to rest on it. The rods are still protected, the length of the case being so approximated that baggage of ordinary dimensions, if permitted to rest on the case, will bear on the reinforced extremities and not on the medial portion of the case itself. In other words, a suit case, for example, if centered on the case would rest on parts of the cup 7 and cap 8 and remain spaced from the intervening body of the case.

There is another feature of the carrier case in which the wrapping 2 plays an important part. This wrapping is a very effective protector of the hand from heat and cold. Leaving the case out in the sun for even a brief period in the summertime tends to heat the tube 1 to such a degree as to make it uncomfortable to handle. If the case is exposed to cold weather the tube 1 would be equally uncomfortable to handle. The wrapping 2 overcomes each disadvantage, acting in the capacity of a modulator and making it possible to comfortably handle the case under either condition.

According to the showing in Figures 1 and 2 the cord 2 is wrapped spirally. It has been mentioned already that this tends to improve one's grip on the case. Insofar as the purpose of the wrapping in guarding the hand against extreme heat and cold is concerned, the showing of cord is not to be regarded as a restriction. Some other covering or wrapping may serve the purpose equally well, although cord or its equivalent is preferred.

Reverting to the shackle 18 of the padlock 19, it may not be amiss to state that when the latter is unlocked so as to enable releasing of the cap 8 the shackle is advisably fitted in the innermost eye 15 whereupon the padlock 19 is replaced thereon to prevent loss of these parts.

While the construction and arrangement of the improved carrier case is that of a generally preferred form, obviously modifications and changes may be made without departing from the spirit of the invention or the scope of the claims.

I claim :—

1. A carrier case comprising a tubular body of thin cross section, a cup secured over one end of said body to provide a bottom and a reinforcement, a ring through which the opposite open end of the body is extended, a cap on the extended open end of the body being abutted by the cap, a carrier strap, eyes attached to the cup and ring, one end of the strap being connected with the cup eye and said strap being threaded through the ring eye, the cup and ring relieving the body of strains imposed on their respective eyes, and means on the cap to which the remaining end of the strap is secured.

2. A carrier case comprising a tubular body, a wrapping applied medially of the body on the outside leaving the ends clear, a cup secured to one end of the body having an outstanding flange abutting one end of the wrapping, the opposite edge of the cup also having an outstanding flange, a pad interposed between the bottom of the cup and the adjacent edge of the tubular body, a ring fitted over the other end of the body in abutment with the other end of the wrapping leaving a portion of said end clear, a cap removably fitted on said end and having a pad interposed between the bottom of the cap and the adjacent edge of the body, and carrying means attached to the cap, ring and cup.

EDWIN B. TURNER.